US008825359B1

(12) United States Patent
Wolf

(10) Patent No.: US 8,825,359 B1
(45) Date of Patent: Sep. 2, 2014

(54) SYSTEMS, METHODS, AND COMPUTER-READABLE MEDIA FOR VERIFYING TRAFFIC DESIGNATIONS OF ROADS

(71) Applicant: Google Inc., Mountain View, CA (US)

(72) Inventor: Daniel Wolf, Menlo Park, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/779,712

(22) Filed: Feb. 27, 2013

(51) Int. Cl.
*G08G 1/08* (2006.01)
*G01C 21/26* (2006.01)

(52) U.S. Cl.
USPC ............................ 701/119; 701/117; 340/907

(58) Field of Classification Search
USPC .......... 701/119, 117, 118; 340/907, 909, 910, 340/995.1
See application file for complete search history.

(56) References Cited

U.S. PATENT DOCUMENTS 5,005,198 A 4/1991 Toda
5,036,532 A 7/1991 Metroka et al.
6,774,816 B1 * 8/2004 Raswant ....................... 340/907
7,221,928 B2 5/2007 Laird et al.
7,536,190 B1 5/2009 Creemer
7,557,730 B2 7/2009 Gueziec
7,701,363 B1 4/2010 Zlojutro
7,912,628 B2 3/2011 Chapman et al.
8,000,892 B2 8/2011 Banerjee
8,099,236 B2 1/2012 Olson et al.
8,103,439 B2 1/2012 Onishi et al.
8,160,805 B2 4/2012 Downs et al.
8,260,542 B2 9/2012 Kimishima
8,275,490 B2 9/2012 Brusilovsky et al.
8,346,465 B2 1/2013 Panganiban et al.
8,386,157 B2 2/2013 Kim
8,694,241 B1 4/2014 Kadous et al.
2004/0002366 A1 1/2004 Cromer et al.
2004/0097275 A1 5/2004 Ohno et al.
2004/0102893 A1 5/2004 Atkinson et al.
2004/0204840 A1 10/2004 Hashima et al.
2007/0038364 A1 2/2007 Lee et al.
2007/0072553 A1 3/2007 Barbera
2008/0033635 A1 2/2008 Obradovich et al.
2008/0082254 A1 4/2008 Huhtala et al.
2008/0234921 A1 9/2008 Groenhuijzen et al.
2008/0300782 A1 12/2008 Kohno et al.

(Continued)

OTHER PUBLICATIONS

Lester, J., et al., "MobileSense—Sensing Modes of Transportation in Studies of the Built Environment," International Workshop on Urban, Community and Social Applications of Networked Sensing Systems, Nov. 4, 2008, pp. 46-50.

(Continued)

*Primary Examiner* — Tan Q Nguyen
(74) *Attorney, Agent, or Firm* — Bracewell & Giuliani LLP

(57) ABSTRACT

Provided are systems, methods, and computer-readable for verifying the traffic designations of roads of a geographic map. Location data for a geographic area is obtained and location data points are filtered based on speed. A road network for the geographic area is obtained, and location data points are associated with a road based on proximity and heading with respect to the orientation of the road. The associated location data points in each direction are counted and used to determine a traffic direction. The traffic direction is compared to the existing traffic designation for the road, and conflicts are identified, such as missing one-way designations, unlikely one-way designations, and incorrect one-way designations.

20 Claims, 5 Drawing Sheets

(56) References Cited

U.S. PATENT DOCUMENTS

| | | | | |
|---|---|---|---|---|
| 2008/0312819 | A1 | 12/2008 | Banerjee | |
| 2009/0029687 | A1 | 1/2009 | Ramer et al. | |
| 2009/0281719 | A1 | 11/2009 | Jakobson | |
| 2010/0125409 | A1 | 5/2010 | Prehofer | |
| 2010/0156709 | A1 | 6/2010 | Zhang et al. | |
| 2010/0332119 | A1 | 12/2010 | Geelen et al. | |
| 2011/0015817 | A1 | 1/2011 | Reeve | |
| 2011/0106416 | A1 | 5/2011 | Scofield et al. | |
| 2011/0199259 | A1 | 8/2011 | Karaoguz et al. | |
| 2011/0224898 | A1 | 9/2011 | Scofield et al. | |
| 2011/0282576 | A1* | 11/2011 | Cabral et al. | 701/201 |
| 2012/0021717 | A1 | 1/2012 | Schmidt | |
| 2012/0046860 | A1 | 2/2012 | Curtis et al. | |
| 2012/0053823 | A1 | 3/2012 | Wilson | |
| 2012/0109517 | A1 | 5/2012 | Watanabe | |
| 2012/0115505 | A1 | 5/2012 | Miyake et al. | |
| 2012/0253656 | A1 | 10/2012 | Brandt | |
| 2012/0303271 | A1 | 11/2012 | Chowdhary et al. | |
| 2012/0316774 | A1 | 12/2012 | Yariv et al. | |
| 2012/0330544 | A1 | 12/2012 | Joong et al. | |
| 2013/0006517 | A1 | 1/2013 | Ofek et al. | |

OTHER PUBLICATIONS

Welbourne, E., et al., "Mobile Context Inference Using Low-Cost Sensors," T. Strang and C. Linnhoff-Popien: LoCA 2005, LNCS 3479, pp. 254-263.

"Path Tracker", Pathtracks.com, 2 pages, [online] [retrieved on Mar. 31, 2011] retrieved from the internet <URL:http://pathtracks.com/>.

"Global Positioning System" Wikipedia, Last Modified on Mar. 28, 2011, 18 Pages, [online] [retrieved on Mar. 31, 2011] retrieved from the Internet <URL:http://en.wikipedia.orq/wiki/Global_Positioning_System>.

Schussler, N., et al., "Identifying trips and activities and their characteristics from GPS raw data without further information" 8th International Conference on Survey Methods in Transport, Annecy, May 2008, pp. 1-28.

Stopher, P., et al., "Deducing mode and purpose from GPS data" Institute of Transport and Logistics Studies, Apr. 2008, pp. 1-13.

Upadhyay, et al., "Optimal parameter values for mode detection in GPS post-processing: An experiment" Working Paper, 507, IVT, ETH Zurich, Zurich, Jul. 2008, 23 Pages.

* cited by examiner

SYSTEMS, METHODS, AND COMPUTER-READABLE MEDIA FOR VERIFYING TRAFFIC DESIGNATIONS OF ROADS

BACKGROUND OF THE INVENTION

1. Field of the Invention

This invention relates generally to computer-implemented geographic maps and, more particularly, to determining traffic designations of roads.

2. Description of the Related Art

Computer-implemented geographic maps are useful for a variety of purposes. For example, users may interact with computer-implemented geographic maps to learn about a geographic area, to identify the location of geographically-distributed objects (e.g., man-made structures or natural features) in a geographic area, search for categories of objects in a geographic area (e.g., restaurants in a given city), identify routes between locations in a geographic area (e.g., driving directions from a current location to a desired destination), and so on.

Such geographic maps may include features such as roads, intersections, and various other features. However, determining the type of road may be difficult based on the geographic data included in the geographic maps. For example, it may be difficult to determine or verify if a road is a one-way road or a two-way road based on existing geographic map data. Moreover, the inability to determine or verify the type of road of a geographic map may affect the accuracy of determined driving routes and may confuse users of the geographic map.

SUMMARY OF THE INVENTION

Various embodiments of systems, methods, and computer-readable media for verifying traffic designations of roads are provided herein. In some embodiments, a method for verifying a traffic designation of a road is provided. The method includes obtaining, by one or more processors, location data in a geographic area, the location data including a plurality of points each having a heading and a speed and associating, by one or more processors, a first group of the plurality of points with a selected road in the geographic area, the selected road having a traffic designation. The method further includes counting, by one or more processors, a first number of the first group of points having a heading in a first direction and counting, by one or more processors, a second number of the first group of points having a heading in a second direction substantially opposite the first direction. Additionally, the method includes determining a traffic direction of the road based on the first number and the second number and determining, by one or more processors, whether a conflict exists between the determined traffic direction and the traffic designation of the road.

In another embodiment, a non-transitory tangible computer-readable storage medium having executable computer code stored thereon for verifying a traffic designation of a road is provided. The computer code includes a set of instructions that causes one or more processors to perform the following: obtaining, by one or more processors, location data in a geographic area, the location data including a plurality of points each having a heading and a speed and associating, by one or more processors, a first group of the plurality of points with a selected road in the geographic area, the selected road having a traffic designation. The computer code further includes a set of instructions that causes one or more processors to perform the following: counting, by one or more processors, a first number of the first group of points having a heading in a first direction and counting, by one or more processors, a second number of the first group of points having a heading in a second direction substantially opposite the first direction. Additionally, computer code also includes a set of instructions that causes one or more processors to perform the following: determining a traffic direction of the road based on the first number and the second number and determining, by one or more processors, whether a conflict exists between the determined traffic direction and the traffic designation of the road.

Additionally, in other embodiments, a system for verifying a traffic designation of a road is provided. The system includes one or more processors and a non-transitory tangible memory accessible by the one or more processors and having executable computer code stored thereon. The computer code includes a set of instructions that causes one or more processors to perform the following: obtaining, by one or more processors, location data in a geographic area, the location data including a plurality of points each having a heading and a speed and associating, by one or more processors, a first group of the plurality of points with a selected road in the geographic area, the selected road having a traffic designation. The computer code further includes a set of instructions that causes one or more processors to perform the following: counting, by one or more processors, a first number of the first group of points having a heading in a first direction and counting, by one or more processors, a second number of the first group of points having a heading in a second direction substantially opposite the first direction. Additionally, computer code also includes a set of instructions that causes one or more processors to perform the following: determining a traffic direction of the road based on the first number and the second number and determining, by one or more processors, whether a conflict exists between the determined traffic direction and the traffic designation of the road.

Figure 1:
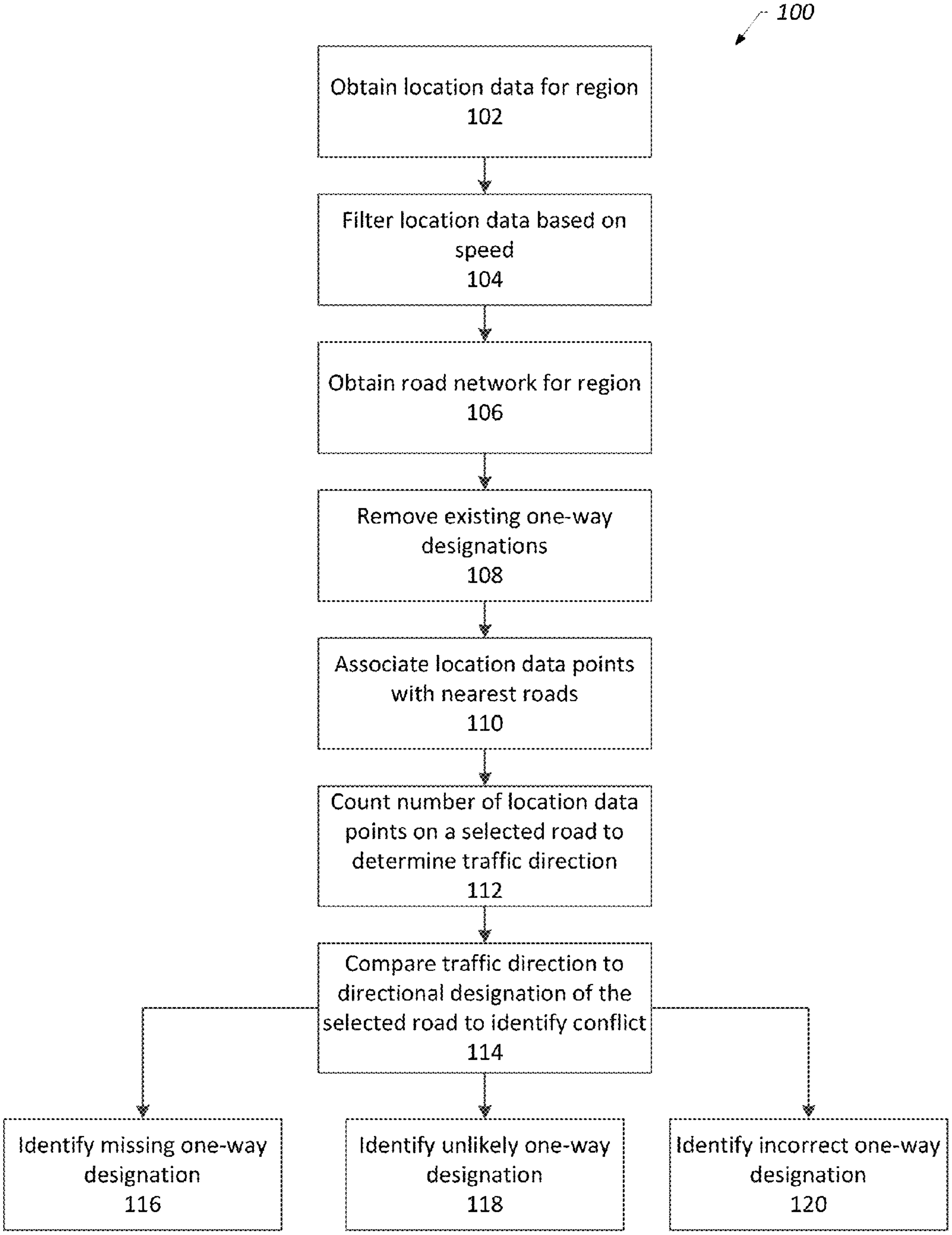
FIG. 1 is a block diagram that illustrates a process for verifying the traffic designations of roads in accordance with embodiments of the present invention.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION

As discussed in more detail below, provided in some embodiments are systems, methods, and computer-readable media for verifying traffic designations of roads. Location data is obtained, such as from a location-based service. The location data includes location data points having a heading and a speed. The location data is filtered based on speed, such that all data points below a speed threshold are discarded. A road network for a geographic area is obtained that includes roads having traffic designations, such as one-way designations and two-way designations. The one-way designations for the obtained roads are removed. The filtered location data points are then associated with a road and a first direction or second direction of the road. In some embodiments, the association between a location data point and a road is a function of the proximity of the data point to the road and the heading of the data point with respect to the orientation of the road.

Next, for a selected road, the data points in the first direction are counted and the location data points in the second direction are counted. Based on a comparison between the counts, a traffic direction of the road is determined. For example, if almost all of the counts of the location data points associated with the road are in the first direction, and almost no counts are of location data points in the second direction, the selected road is likely a one-way road in the first direction. Similarly, if the counts of the location data points in the first direction are nearly equal to the counts of the location data points in the second direction, the selected road is likely a two-way road. The determined traffic direction is compared to the existing traffic designation of the road to determine a conflict. For example, the selected road may have a missing one-way designation, an unlikely one-way designation, or an incorrect one-way designation. If the selected road has a conflict between the determined traffic direction and the existing traffic designation, the road may be identified for verification by an operator.

FIG. 1 depicts a process 100 for verifying traffic designations of roads in accordance with embodiments of the present invention. Some or all steps of the process 100 may be implemented as executable code instructions stored on a non-transitory tangible machine readable medium and executed by a processor (e.g., one or more processors) of a computer (e.g., one or more computers). Initially, location data in a geographic area is obtained (block 102). In some embodiments, the location data points each include a heading (i.e., direction) and a speed. In some embodiments, the location data is obtained from a location service that obtains passive location data from portable computers. Moreover, the locations may be disassociated with a user, computer, vehicle and the so on, either before or after transmission, so that locations are not associated with individual user identities or devices (e.g., portable computers, vehicle navigation systems, etc.). Additionally, in some embodiments, the location data may not be collected unless a user has expressly provided permission after receiving notice of the collection of such data and how it is used.

The location data is filtered based on speed (block 104). For example, the location data is filtered to only include the location data points having a speed above a threshold to ensure that only vehicles traversing roads are included in the determination of traffic designations. In some embodiments, the location data points having a speed greater than or equal to 5 kilometers/hour are included and location data points having a speed below 5 kilometers/hour are excluded. In some embodiments, the process 100 may use a minimum amount of location data, e.g., a minimum number of location data points, a minimum timeframe of obtained location data, or other minimums, for verifying traffic designations.

Next, a road network for the geographic area is obtained (block 106). For example, the road network for the geographic area may be obtained from a geographic information system (GIS) having road data for the region. The obtained road network may also include existing traffic designations for the roads of the geographic area. As will be appreciated, some roads in the geographic area may include one-way designations that indicate a restriction to a single direction of travel along such roads. Similarly, some roads in the geographic area may include two-way designations that indicate permitted travel in both directions along such roads. Next, existing one-way designations for roads in the geographic area are removed (block 108).

The filtered location data points are then associated with the nearest roads and a first direction on the road or a second direction opposite the first direction (block 110). In some embodiments, the association is a function of the proximity of each location data point to a road and the heading of the location data point as compared to the orientation of the road. For example, a location data point having a heading that is substantially parallel to the orientation of the nearest road is associated with that road, while a location data point having a heading that is substantially perpendicular to the orientation of the nearest road is not associated with that road. Moreover, it should be appreciated that headings may vary between substantially parallel and substantially perpendicular to the orientation of a road. Thus, in some embodiments, a location data point may be associated with a road if the heading of the location data point is within a specific angle relative to the orientation of the road. Similarly, a location data point may not be associated with a road if the heading of the location data point is outside of a specific angle relative to the orientation of the road. Next, for a selected road, the number of location data points in each direction is counted to determine a traffic direction (block 112). Thus, a road may have a first number of location data points having a heading in the first direction and a second number of location data points having a heading in the second direction opposite the first direction. The determined traffic direction is then compared to the existing traffic designation for the selected road (block 114).

Based on the determined traffic direction and the existing traffic designation for the selected road, various conflicts may be identified. In one instance, a missing one-way traffic designation is identified (block 116). For example, if almost all of the counts for the selection road are in a first direction, and almost no counts for the selected road are in the second direction, the traffic direction for the selected road is likely one-way. If the road does not have an existing one-way designation, then the road is missing a one-way traffic designation. In another instance, unlikely one-way traffic designations are identified (block 118). If nearly half of the counts for the selected road are in the first direction, and nearly half of the counts for the selected road are in the second direction opposite the first direction, the traffic direction of the selected road is likely two-way. If the selected road has an existing one-way designation, then this existing one-way traffic designation is unlikely. In another instance, incorrect one-way traffic designations are identified (block 120). For example, if almost all of the counts for the selected road are in the first or second direction that is opposite to the existing one-way designation for the selected road, then the existing one-way traffic designation is incorrect. In such an instance, the determined traffic direction indicates that substantially all of the vehicles are traversing the road in a direction opposite to the existing one-way designation.

Figure 2:
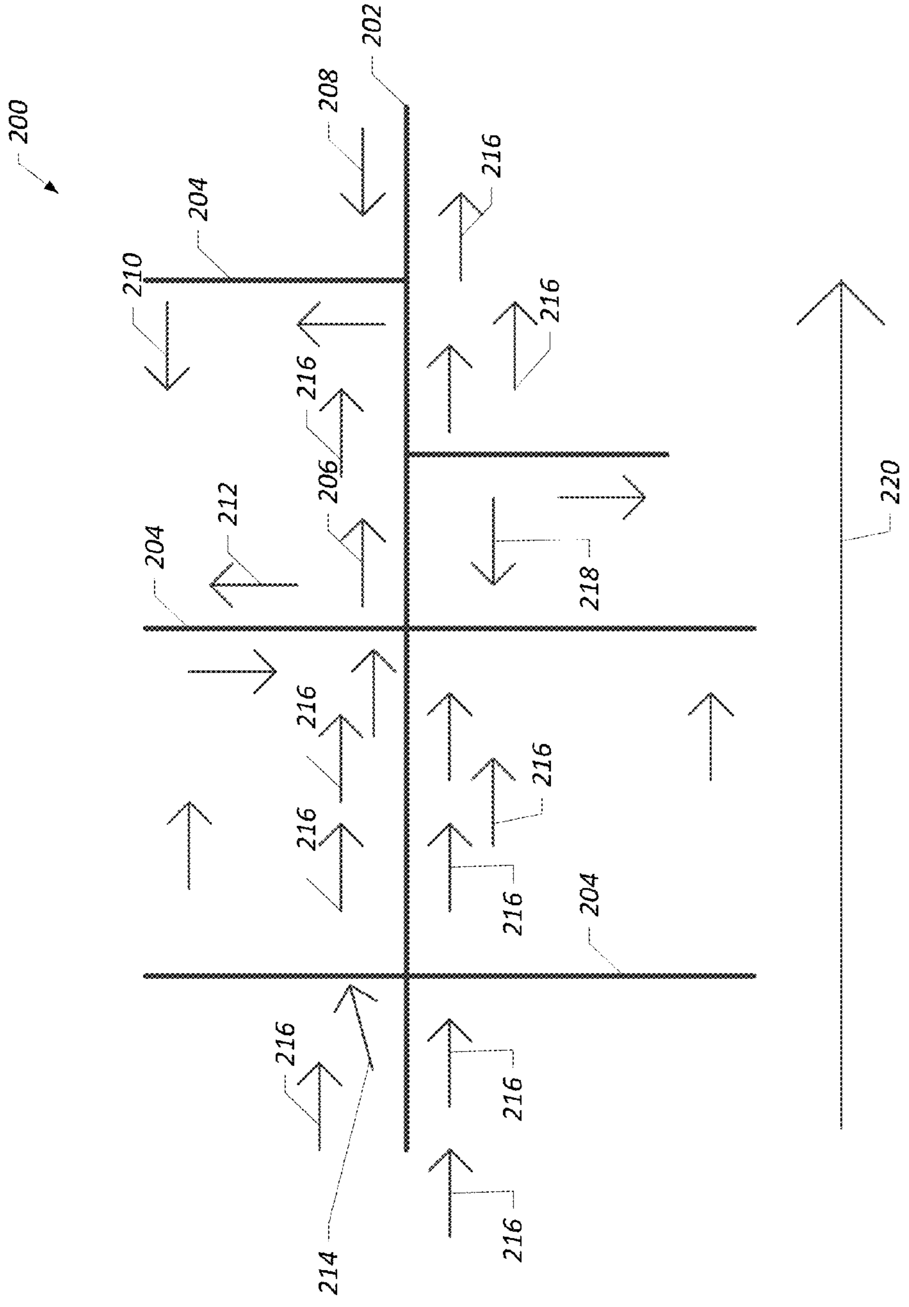
FIG. 2 is a schematic diagram of a road network and filtered location data points in accordance with embodiments of the present invention.

FIG. 2 is a schematic diagram of a road network 200 and filtered location data points that are processed to verify traffic designations of roads in accordance with embodiments of the present invention. As shown in FIG. 2, the heading of each data point is illustrated by a directional arrow. The road network 200 includes a selected road 202 having a first orientation and multiple roads 204 having orientations perpendicular to the selected road 202. It should be appreciated that the road network 200 is merely an example and other road networks will have roads at any number of angles and orientations with respect to each other.

The location data points illustrated in FIG. 2 are processed in the manner described above in FIG. 1. Accordingly, as described above in block 110, location data points are associated with a road based on their proximity to the road and heading with respect to orientation of the road. For example, as shown in FIG. 2, data points 206 and 208 may be associated with the road 202. Data point 206 has a first heading substantially parallel to the orientation of the road 202, and data point 208 has a second heading also substantially parallel to the orientation of the road 202. In another example, data point 210 may be outside the specified proximity to road 202 and may not be associated with the road 202. Similar, data point 212 may be within the specified proximity to road 202 but may have a heading substantially perpendicular to the road 202. Thus, data point 212 is not associated with the road 202 and, in some embodiments, may be associated with one of the perpendicular roads 204. As will be appreciated, some location data points, such as data point 214, may be neither substantially parallel nor substantially perpendicular to the road 202. Thus, as described above, in some embodiments, the association of location data points based on heading may be based on an angle threshold with respect to the orientation of the road. For example, if a location data point is within 5 degrees or less, 10 degrees or less, 15 degrees or less, or other angle threshold with respect to a road orientation, the location data point may be associated with the road. Thus, for example, location data point 214 may be associated with the road 202 and the first direction shared by location point 206.

As described above in block 112, the location data points associated with a road are counted to determine a traffic direction of the road. For example, as shown in FIG. 2, the location data points in a first direction and a second direction opposite the first direction and associated with the road 202 are counted to determine the direction of the road 202. For example, the location data points 206 and 216 associated with the road 202 and in a first direction are counted. Similar, the location data points 208 and 218 associated with the road and in a second direction opposite the first direction are counted. As described above in block 114, the number of location data points in each direction is compared to determine the traffic direction of the road. For example, using the example illustrated in FIG. 2, the count of the location data points 206 and 216 in the first direction is substantially greater than the count of the location data points 208 and 218 in the second direction. Thus, the road 202 is likely a one-way road having a traffic direction indicated by the arrow 220 that in the same direction as the location data points 206 and 216. The determined traffic direction may then be compared to the existing traffic designation for the road 202 to identify the conflicts described above in blocks 116, 118, and 120.

Figure 3:
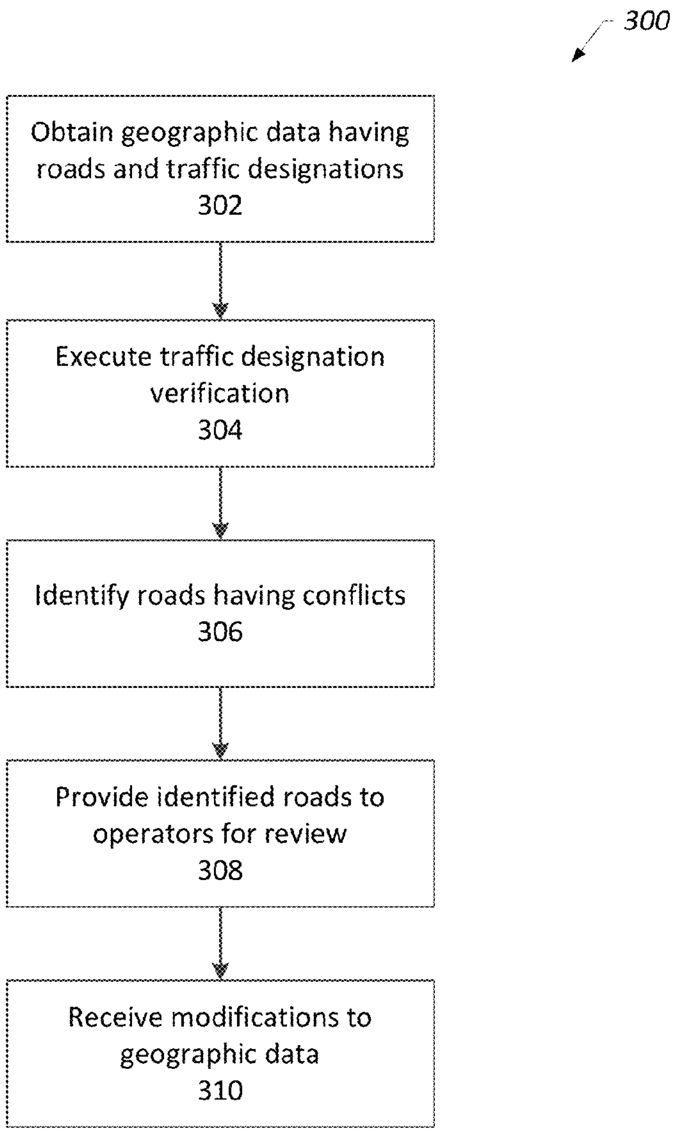
FIG. 3 using a traffic designation verification of roads in accordance with embodiments of the present invention.

FIG. 3 depicts a process 300 for using a traffic designation verification of roads in accordance with embodiments of the present invention. Some or all steps of the process 300 may be implemented as executable code instructions stored on a non-transitory tangible machine readable medium and executed by a processor (e.g., one or more processors) of a computer (e.g., one or more computers). Initially, geographic data having roads and traffic designations is obtained (block 302). Next, the traffic designation verification process described above in FIG. 1 is executed (block 304). For example, a road network in a selected geographic area may be obtained and traffic designation of roads in the selected region may be processed using location data in the manner described above. Next, the roads having identified issues are identified (block 306). As described above, various conflicts may be identified between a determined traffic direction associated with a road to the existing traffic designation of a road. For example, missing one-way designations, unlikely one-way designations, and incorrect one-way designations for selected roads may be identified. The identifications may be stored and transmitted over a network.

Next, identified roads are provided to operators for review (block 308). For example, the operators may compare the existing traffic designations of the identified roads to additional verification data to determine if the existing traffic designation needs to be changed. In some embodiments, the operators may request manual verification of the traffic designation of identified roads. Based on the review, operators may modify the traffic designations of identified roads to the correct traffic designation. Subsequently, modifications to the geographic data may be received (block 310) and propagated to a GIS.

Figure 4:
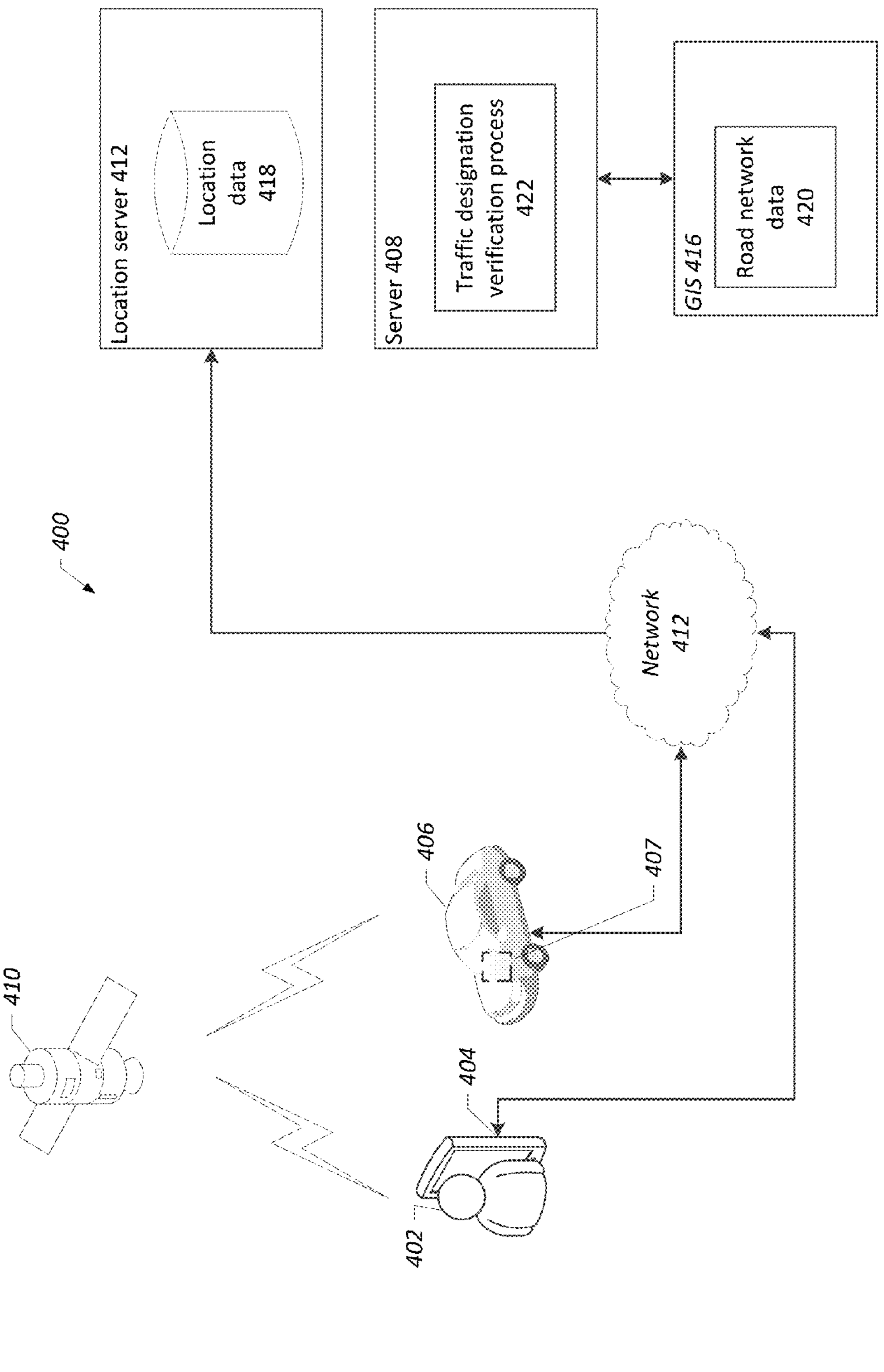
FIG. 4 is a schematic diagram of a system for verifying the traffic designation of roads in accordance with embodiments of the present invention.

FIG. 4 depicts a system 400 for verifying the traffic designation of roads in accordance with embodiments of the present invention. As shown in FIG. 4, the system 400 includes include a user 402 interacting with a computer, e.g., portable computer 404, a vehicle 406 having a vehicle navigation system 407, and a server 408. The portable computer 404 may include laptop computers, tablet computers, smartphones, personal digital assistants, etc., and may include a receiver for a satellite-based positioning system 410, such as a Global Positioning System (GPS) receiver. The vehicle 406 may be automobiles, motorcycles, buses, commercial vehicles, or any other vehicles. The vehicle 406 may also include a computer, e.g., vehicle navigation system 407, which may also include receivers for the satellite-based positioning system 410, such as GPS receivers. The vehicle navigation system 407 may be permanently integrated in the vehicle 406, or the system 407 may be a standalone (e.g., portable) navigation system removable from the vehicle 406. In some embodiments, a user in a vehicle (e.g., vehicle 406) may use a portable computer (e.g., portable computer 404), a vehicle navigation system (e.g., vehicle navigation system 407), or both to view interactive maps, find and input destinations, determine routes and so on.

The portable computer 404, and the vehicle navigation system 404, may also be in communication with a network 412 in addition to the satellite-based positioning system 410. For example, as the portable computer 404 and the vehicle 406 traverse geographic areas, the location of the portable computer 404 and the vehicle navigation system 407 on a geographic map may be determined via communication with the satellite-based positioning system 410. In some embodiments, the postilion of the portable computer and the vehicle navigation system 406 may also be determined using the network 412, such as tokens obtained from the network (e.g., an IP address), signals received from the network (e.g., Wi-Fi signals) and so on. The location may be stored on memories of the portable computer 404 and the vehicle navigation system 407 and, as described further below, may be transmitted over the network 412 to the server 408.

The portable computer 404, the vehicle navigation system 407, and the server 408 may be in communication with the network 412, such as through a network interface having a cellular antenna, a wireless Ethernet antenna, etc. In some embodiments, the network 412 may include multiple networks, such as a wireless Ethernet network, a cellular network, or other wireless networks. Moreover, it should be appreciated that the portable computer 404, the vehicle navigation system 407, and the server 408 may each communicate over additional and different networks. For example, the portable computer 404 may communicate over a wireless Ethernet network, the vehicle navigation system 407 may communicate over a cellular network.

The server 408 may be a single server (in a discrete hardware component or as a virtual server) or multiple servers. The server 408 may include web servers, application servers, or other types of servers. Additionally, the server 408 may include, for example, computers arranged in any physical and virtual configuration, such as computers in one or more data processing centers, a distributed computing environment, or other configuration. Such configurations may use the network 412 for communication or may communicate over other networks. In some embodiments, the server 408 may be a part of a geographic information system (GIS).

The portable computer 404 and vehicle navigation system 407 may transmit their present location, as determined via the satellite-based positioning system 410, to the server 408 for processing in accordance with the techniques described below. In other embodiments, the location of the portable computer 404 and vehicle navigation system 407 may be determined with assistance of data received from the network 412, such as by assisted GPS (A-GPS). In other embodiments, the locations of the portable computer 404 and vehicle navigation system 407 may be determined solely from data received from the network 412. Moreover, the locations may be disassociated with a user, computer, vehicle and the so on, either before or after transmission, so that locations are not associated with individual user identities or devices (e.g., portable computers, vehicle navigation systems, etc.). Additionally, in some embodiments, the location data may not be collected unless a user has expressly provided permission after receiving notice of the collection of such data and how it is used.

The server 408 may include or communicate with a location server 412 (e.g., one or more servers) and a GIS 416 (e.g., a GIS implemented on one or more servers). As described above, the locations determined by the portable computer 404 and the vehicle navigation system 407 are transmitted to the location server 412 and stored in a location data repository 418. For example, in some embodiments the location server 412 may a part of a location-based service that enables a user to track his or her own location and view locations of "friends" from a social graph associated with the user. As mentioned above, the GIS 416 includes road network data 420 that includes traffic designations for roads in a geographic area.

The server 408 includes a traffic designation verification process 422 that obtains data from the location server 412 and the GIS 416 and determines conflicts with existing traffic designation data for roads. Location data is obtained from the location data 418 of the server 412 and a road network is obtained from the road network data 420 of the GIS 416. The traffic designation verification process 422 processes the data as described above in FIG. 1 and determines conflicts with existing traffic designations. For example, as described above, the traffic designation verification process 422 may determine that a one-way designation for a road is missing, that a one-way designation for a road is unlikely, or that a one-way designation for a road is incorrect. Based on these determinations, operators may interact with the GIS 416 to verify and correct the road network data 420.

Figure 5:
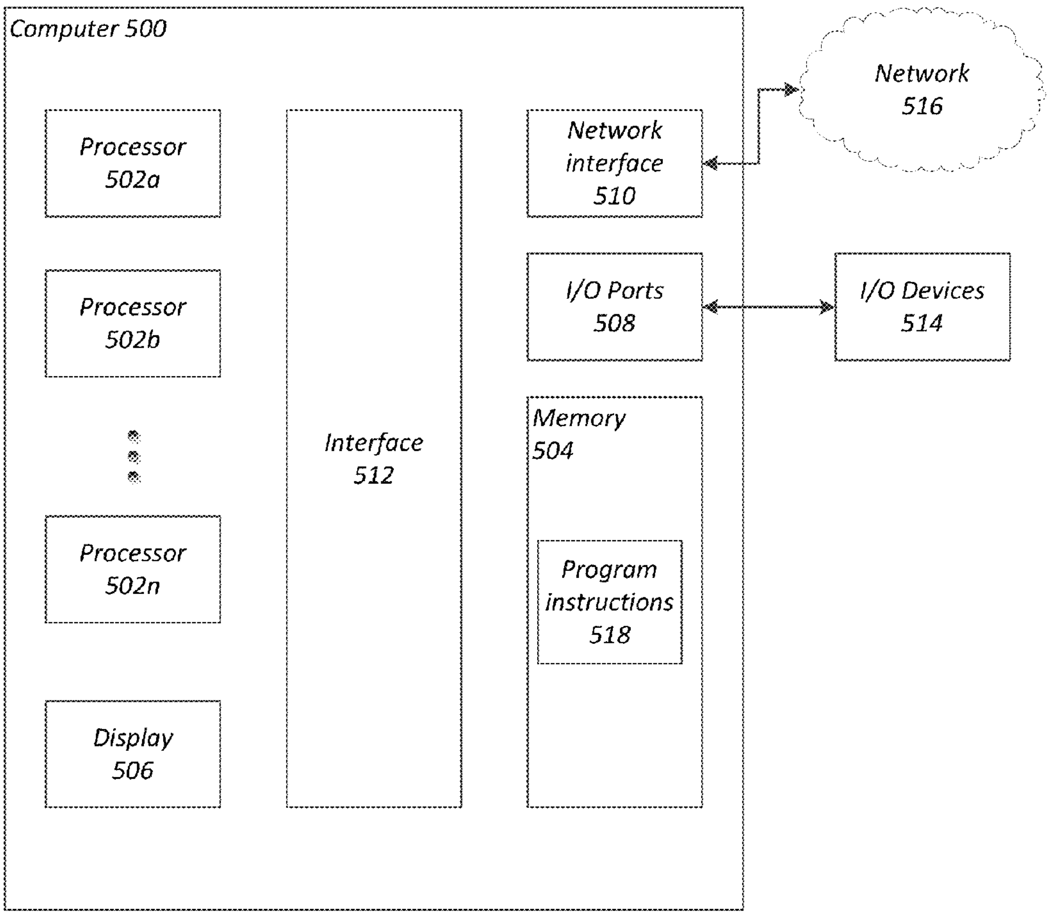
FIG. 5 is a block diagram of a computer in accordance with embodiments of the present invention.

FIG. 5 depicts a computer 500 in accordance with an embodiment of the present invention. Various portions or sections of systems and methods described herein include or are executed on one or more computers similar to computer 500 and programmed as special-purpose machines executing some or all steps of processes described above as executable computer code. Further, processes, modules, and other components described herein may be executed by one or more processing systems similar to that of computer 500.

The computer 500 may include various components that contribute to the function of the device and enable the computer 500 to function in accordance with the techniques discussed herein. As will be appreciated, some components of computer 500 may be provided as internal or integral components of the computer 500 and some components may be provided as external or connectable components. Moreover, FIG. 5 depicts one example of a particular implementation and is intended to illustrate the types of components and functions that may be present in various embodiments of the computer 500.

Computer 500 may include a combination of devices or software that may perform or otherwise provide for the performance of the techniques described herein. For example, computer 500 may include or be a combination of a cloud-computing system, a data center, a server rack or other server enclosure, a server, a virtual server, a desktop computer, a laptop computer, a tablet computer, a mobile telephone, a personal digital assistant (PDA), a media player, a game console, a vehicle-mounted computer, or the like. The computer 500 may be a unified device providing any one of or a combination of the functionality of a media player, a cellular phone, a personal data organizer, a game console, and so forth. Computer 500 may be connected to other devices that are not illustrated or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available. As shown in the embodiment illustrated in FIG. 5, the computer 500 may include one or more processors (e.g., processors 502*a*-502*n*), a memory 504, a display 506, I/O ports 508 a network interface 510, and an interface 512. Additionally, the computer 500 may include or be coupled to I/O devices 514.

In addition, the computer 500 may allow a user to connect to and communicate through a network 516 (e.g., the Internet, a local area network, a wide area network, etc.) and, in some embodiments, to acquire data from a satellite-based positioning system (e.g., GPS). For example, the computer 500 may allow a user to communicate using e-mail, text messaging, instant messaging, or using other forms of electronic communication, and may allow a user to obtain the location of the device from a satellite-based positioning system.

In some embodiments, the display 506 may include a liquid crystal display (LCD) an organic light emitting diode (OLED) display, or other display types. The display 506 may display a user interface (e.g., a graphical user interface) executed by the processor 502 of the computer 500. The display 506 may also display various indicators to provide feedback to a user, such as power status, call status, memory status, network status etc. These indicators may be incorporated in the user interface displayed on the display 506. In some embodiments, the display 506 may include or be provided in conjunction with touch sensitive elements through which a user may interact with the user interface. In such embodiments, a touch-sensitive display may be referred to as a "touch screen" and may also be known as or called a touch-sensitive display system.

The processor 502 may provide the processing capability to execute the operating system, programs, user interface, and other functions of the computer 500. The processor 502 may include one or more processors and may include "general-purpose" microprocessors, special purpose microprocessors, such as application-specific integrated circuits (ASICs), or any combination thereof. In some embodiments, the processor 502 may include one or more reduced instruction set (RISC) processors, such as those implementing the Advanced RISC Machine (ARM) instruction set. Additionally, the processor 502 may include single-core processors and multicore processors and may include graphics processors, video processors, and related chip sets. Accordingly, the computer 500 may be a uni-processor system having one processor (e.g., processor 502*a*), or a multi-processor system having two or more suitable processors (e.g., 502*a*-502*n*). Multiple processors may be employed to provide for parallel or sequential execution of the techniques described herein. Processes, such as logic flows, described herein may be performed by the processor 502 executing one or more computer programs to perform functions by operating on input data and generating corresponding output. The processor 502 may receive instructions and data from a memory (e.g., system memory 504).

The memory 504 (which may include one or more tangible non-transitory computer readable storage mediums) may include volatile memory and non-volatile memory accessible by the processor 502 and other components of the computer 500. The memory 504 may store a variety of information and may be used for a variety of purposes. For example, the memory 504 may store executable computer code, such as the firmware for the computer 500, an operating system for the computer 500, and any other programs or other executable code for providing functions of the computer 500. Such executable computer code may include program instructions 518 executable by a processor (e.g., one or more of processors 502*a*-502*n*) to implement one or more embodiments of the present invention. Program instructions 518 may include modules of computer program instructions for implementing one or more techniques described herein. Program instructions 518 may include a computer program (which in certain forms is known as a program, software, software application, script, or code). A computer program may be written in a programming language, including compiled or interpreted languages, or declarative or procedural languages. A computer program may include a unit suitable for use in a computing environment, including a stand-alone program, a module, a component, a subroutine, and the like. A computer program may or may not correspond to a file in a file system. A computer program may be stored in a section of a file that holds other computer programs or data (e.g., one or more scripts stored in a markup language document), in a single file dedicated to the program in question, or in multiple coordinated files (e.g., files that store one or more modules, sub programs, or sections of code). A computer program may be deployed to be executed on one or more processors located locally at one site or distributed across multiple remote sites and interconnected by a communication network. Additionally, the memory 504 may be used for buffering or caching during operation of the computer 500.

As mentioned above, the memory 504 may include volatile memory, such as random access memory (RAM). The memory 504 may also include non-volatile memory, such as ROM, flash memory, a hard drive, other suitable optical, magnetic, or solid-state storage mediums or any combination thereof. The memory 504 may store data files such as media (e.g., music and video files), software (e.g., for implementing functions on computer 500), user preference information, payment transaction information, wireless connection information, contact information (e.g., an address book), and any other suitable data.

The interface 512 may include multiple interfaces and may enable communication between various components of the computer 500, the processor 502, and the memory 504. In some embodiments, the interface 512, the processor 502, memory 504, and one or more other components of the computer 500 may be implemented on a single chip, such as a system-on-a-chip (SOC). In other embodiments, these components, their functionalities, or both may be implemented on separate chips. The interface 512 may coordinate I/O traffic between processors 502*a*-502*n*, the memory 504, the network interface 510, 514, or any other devices or a combination thereof. The interface 512 may perform protocol, timing or other data transformations to convert data signals from one component (e.g., the memory 504) into a format suitable for use by another component (e.g., processors 502*a*-502*n*). The interface 512 may implement various types of interfaces, such as Peripheral Component Interconnect (PCI) interfaces, the Universal Serial Bus (USB) interfaces, Thunderbolt interfaces, Firewire (IEEE-1394) interfaces, and so on.

The computer 500 may also include an input and output port 508 to enable connection of additional devices, such as I/O devices 514. Embodiments of the present invention may include any number of input and output ports 508, including headphone and headset jacks, universal serial bus (USB) ports, Firewire (IEEE-1394) ports, Thunderbolt ports, and AC and DC power connectors. Further, the computer 500 may use the input and output ports to connect to and send or receive data with any other device, such as other portable computers, personal computers, printers, etc.

The computer 500 depicted in FIG. 5 also includes a network interface 510. The network interface 510 may include a wired network interface card (NIC), a wireless (e.g., radio frequency) network interface card, or combination thereof. The network interface 510 may include known circuitry for receiving and sending signals to and from communications networks, such as an antenna system, an RF transceiver, an amplifier, a tuner, an oscillator, a digital signal processor, a modem, a subscriber identity module (SIM) card, memory, and so forth. The network interface 510 may communicate with networks (e.g., network 516), such as the Internet, an intranet, a cellular telephone network, a wide area network (WAN), a local area network (LAN), a metropolitan area network (MAN), or other devices by wired or wireless communication. The communication may use any suitable communications standard, protocol and technology, including Ethernet, Global System for Mobile Communications (GSM), Enhanced Data GSM Environment (EDGE), a 3G network (e.g., based upon the IMT-2000 standard), high-speed downlink packet access (HSDPA), wideband code division multiple access (W-CDMA), code division multiple access (CDMA), time division multiple access (TDMA), a 4G network (e.g., IMT Advanced, Long-Term Evolution Advanced (LTE Advanced), etc.), Bluetooth, Wireless Fidelity (Wi-Fi) (e.g., IEEE 802.11 standards), voice over Internet Protocol (VoIP), Wi-MAX, an email protocol (e.g., Internet message access protocol (IMAP) or post office protocol (POP)), message-oriented protocols (e.g., extensible messaging and presence protocol (XMPP), Multimedia Messaging Service (MMS), Short Message Service (SMS), or any other suitable communications standards, protocols, and technologies.

Various embodiments may further include receiving, sending or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed or omitted, and certain features of the invention may be utilized independently, all as would be apparent to one skilled in the art after having the benefit of this description of the invention. Changes may be made in the elements described herein without departing from the spirit and scope of the invention as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" mean including, but not limited to. As used throughout this application, the singular forms "a", "an" and "the" include plural referents unless the content clearly indicates otherwise. Thus, for example, reference to "an element" includes a combination of two or more elements. Unless specifically stated otherwise, as apparent from the discussion, it is appreciated that throughout this specification discussions utilizing terms such as "processing", "computing", "calculating", "determining" or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical electronic or magnetic quantities within memories, registers, or other information storage devices, transmission devices, or display devices of the special purpose computer or similar special purpose electronic processing/computing device.

What is claimed is:

1. A computer-implemented method for verifying a traffic designation of a road, the method comprising:

- obtaining, by one or more processors, location data in a geographic area, the location data including a plurality of points each having a heading and a speed;
- associating, by one or more processors, a first group of the plurality of points with a selected road in the geographic area, the selected road having a traffic designation;
- counting, by one or more processors, a first number of the first group of points having a heading in a first direction;
- counting, by one or more processors, a second number of the first group of points having a heading in a second direction substantially opposite the first direction;
- determining a traffic direction of the road based on the first number and the second number; and
- determining, by one or more processors, whether a conflict exists between the determined traffic direction and the traffic designation of the road.

2. The computer-implemented method of claim 1, wherein the traffic direction comprises one-way traffic in the first direction, one-way traffic in the second direction, or two-way traffic.

3. The computer-implemented method of claim 1, wherein determining whether a conflict exists between the traffic designation of the road and the traffic direction comprises determining that the traffic direction is in the first direction and the traffic designation designates the second direction.

4. The computer-implemented method of claim 1, wherein determining whether a conflict exists between the traffic designation of the road and the traffic direction comprises determining that that the traffic direction comprises two-way traffic.

5. The computer-implemented method of claim 1, wherein determining whether a conflict exists between the traffic designation of the road and the traffic direction comprises determining that the traffic direction is in the first direction and the traffic designation designates two-way traffic.

6. The computer-implemented method of claim 1, comprising obtaining a road network comprising the selected road from a geographic information system (GIS).

7. The computer-implemented method of claim 6, comprising removing one-way designations from one or more roads of the road network.

8. The computer-implemented method of claim 1, wherein the association between a first group of the plurality of points with a selected road in the geographic area is a function of the proximity of each of the first group of points to the selected road and the heading of the first group of points to with respect to the orientation of the selected road.

9. The computer-implemented method of claim 1, comprising filtering the plurality of points based on the respective speed of each of the plurality of points.

10. The computer-implemented method of claim 1, comprising identifying the selected road for review by an operator associated with the GIS.

11. A non-transitory tangible computer-readable storage medium having executable computer code stored thereon for verifying a traffic designation of a road, the computer code comprising a set of instructions that causes one or more processors to perform the following:

- obtaining, by one or more processors, location data in a geographic area, the location data including a plurality of points each having a heading and a speed;
- associating, by one or more processors, a first group of the plurality of points with a selected road in the geographic area, the selected road having a traffic designation;
- counting, by one or more processors, a first number of the first group of points having a heading in a first direction;
- counting, by one or more processors, a second number of the first group of points having a heading in a second direction substantially opposite the first direction;
- determining a traffic direction of the road based on the first number and the second number; and
- determining, by one or more processors, whether a conflict exists between the determined traffic direction and the traffic designation of the road.

12. The non-transitory tangible computer-readable storage medium of claim 11, wherein determining whether a conflict exists between the traffic designation of the road and the traffic direction comprises determining that the traffic direction is in the first direction and the traffic designation designates the second direction.

13. The non-transitory tangible computer-readable storage medium of claim 11, wherein determining whether a conflict exists between the traffic designation of the road and the traffic direction comprises determining that that the traffic direction comprises two-way traffic.

14. The non-transitory tangible computer-readable storage medium of claim 11, wherein determining whether a conflict exists between the traffic designation of the road and the traffic direction comprises determining that the traffic direction is in the first direction and the traffic designation designates two-way traffic.

15. The non-transitory tangible computer-readable storage medium of claim 11, comprising identifying the selected road for review by an operator associated with the GIS.

16. A system for verifying a traffic designation of a road, the system comprising one or more processors;

a non-transitory tangible memory accessible by the one or more processors and having executable computer code stored thereon, the computer code comprising a set of instructions that causes one or more processors to perform the following:

obtaining, by one or more processors, location data in a geographic area, the location data including a plurality of points each having a heading and a speed;

associating, by one or more processors, a first group of the plurality of points with a selected road in the geographic area, the selected road having a traffic designation;

counting, by one or more processors, a first number of the first group of points having a heading in a first direction;

counting, by one or more processors, a second number of the first group of points having a heading in a second direction substantially opposite the first direction;

determining a traffic direction of the road based on the first number and the second number; and determining, by one or more processors, whether a conflict exists between the determined traffic direction and the traffic designation of the road.

17. The system of claim 16, wherein determining whether a conflict exists between the traffic designation of the road and the traffic direction comprises determining that the traffic direction is in the first direction and the traffic designation designates the second direction.

18. The system of claim 16, wherein determining whether a conflict exists between the traffic designation of the road and the traffic direction comprises determining that that the traffic direction comprises two-way traffic.

19. The system of claim 16, wherein determining whether a conflict exists between the traffic designation of the road and the traffic direction comprises determining that the traffic direction is in the first direction and the traffic designation designates two-way traffic.

20. The system of claim 16, comprising identifying the selected road for review by an operator associated with the GIS.

* * * * *